United States Patent
O'Connor

(10) Patent No.: US 8,752,131 B2
(45) Date of Patent: Jun. 10, 2014

(54) FACILITATING PROTECTION OF A MAINTENANCE ENTITY GROUP

(75) Inventor: Donald C. O'Connor, McKinney, TX (US)

(73) Assignee: Fujitsu Limited, Kawasaki-shi (JP)

( * ) Notice: Subject to any disclaimer, the term of this patent is extended or adjusted under 35 U.S.C. 154(b) by 1431 days.

(21) Appl. No.: 12/112,044

(22) Filed: Apr. 30, 2008

(65) Prior Publication Data
US 2009/0276830 A1 Nov. 5, 2009

(51) Int. Cl.
*H04L 29/06* (2006.01)

(52) U.S. Cl.
CPC .......... *H04L 633/0428* (2013.01); *H04L 63/08* (2013.01); *H04L 63/0876* (2013.01)
USPC ................ 726/3; 713/169; 713/170; 713/181

(58) Field of Classification Search
CPC .. H04L 63/0428; H04L 63/08; H04L 63/0876
USPC ............................................................. 726/3
See application file for complete search history.

(56) References Cited

U.S. PATENT DOCUMENTS

| | | | | |
|---|---|---|---|---|
| 6,055,236 | A * | 4/2000 | Nessett et al. | 370/389 |
| 6,304,973 | B1 | 10/2001 | Williams | 713/201 |
| 6,636,520 | B1 | 10/2003 | Jason et al. | 370/401 |
| 6,738,814 | B1 * | 5/2004 | Cox et al. | 709/225 |
| 6,865,602 | B1 | 3/2005 | Nijemcevic et al. | 709/223 |
| 6,931,529 | B2 | 8/2005 | Kunzinger | 713/153 |
| 6,996,842 | B2 | 2/2006 | Strahm et al. | 726/13 |
| 7,032,242 | B1 | 4/2006 | Grabelsky et al. | 726/11 |
| 7,131,141 | B1 | 10/2006 | Blewett et al. | 726/12 |
| 7,359,328 | B1 * | 4/2008 | Allan | 370/236.2 |
| 2001/0047487 | A1 | 11/2001 | Linnakangas et al. | 713/201 |
| 2002/0141340 | A1 * | 10/2002 | Tamura et al. | 370/231 |
| 2002/0161905 | A1 | 10/2002 | Haverinen et al. | 709/229 |
| 2003/0058106 | A1 * | 3/2003 | Ikematsu | 340/568.1 |
| 2003/0084331 | A1 | 5/2003 | Dixon et al. | 713/200 |
| 2003/0182431 | A1 | 9/2003 | Sturniolo et al. | 709/227 |
| 2004/0047353 | A1 | 3/2004 | Umayabashi et al. | 370/395.63 |
| 2004/0073788 | A1 * | 4/2004 | Kim et al. | 713/160 |
| 2004/0093524 | A1 | 5/2004 | Sakai | 713/201 |
| 2004/0141617 | A1 * | 7/2004 | Volpano | 380/270 |

(Continued)

FOREIGN PATENT DOCUMENTS

WO WO 2007/031002 A1 3/2007 ............. H04L 12/46

OTHER PUBLICATIONS

Duffield et al., Resource Management With Hoses: Point-to-Cloud Services for Virtual Private Networks, Oct. 2002, IEEE/ACM Transactions on Networking, vol. 10, No. 5, pp. 679-692.*

(Continued)

*Primary Examiner* — Mohammad L Rahman
*Assistant Examiner* — Kenneth Chang
(74) *Attorney, Agent, or Firm* — Baker Botts L.L.P.

(57) ABSTRACT

According to one embodiment, maintenance points of a maintenance entity group are identified. The maintenance points comprise end points and intermediate points. A secure connectivity association set is established for the maintenance points. The following is performed for each frame of a number of frames: determining security data of the secure connectivity association set; placing the security data into a frame; and communicating the frame to a maintenance point. The maintenance point is configured to determine whether a frame is acceptable from the security data of the frame.

20 Claims, 3 Drawing Sheets

(56) References Cited

U.S. PATENT DOCUMENTS

| | | | |
|---|---|---|---|
| 2004/0160895 A1* | 8/2004 | Holmgren et al. | 370/223 |
| 2005/0099949 A1 | 5/2005 | Mohan et al. | 370/236.2 |
| 2005/0099952 A1 | 5/2005 | Mohan et al. | 370/241 |
| 2005/0099954 A1 | 5/2005 | Mohan et al. | 370/241.1 |
| 2005/0141498 A1* | 6/2005 | Cam Winget et al. | 370/389 |
| 2005/0249119 A1* | 11/2005 | Elie-Dit-Cosaque et al. | 370/236 |
| 2006/0007867 A1 | 1/2006 | Elie-Dit-Cosaque et al. | 370/241.1 |
| 2006/0015935 A1 | 1/2006 | Dixon et al. | 726/11 |
| 2006/0059370 A1 | 3/2006 | Asnis et al. | 713/189 |
| 2006/0092847 A1 | 5/2006 | Mohan | 370/241.1 |
| 2006/0133284 A1 | 6/2006 | Elie-Dit-Cosaque et al. | 370/241.1 |
| 2006/0136715 A1* | 6/2006 | Han et al. | 713/151 |
| 2006/0153220 A1 | 7/2006 | Elie-Dit-Cosaque et al. | 370/432 |
| 2006/0195900 A1 | 8/2006 | Yeh et al. | 726/15 |
| 2007/0002768 A1 | 1/2007 | Nandy et al. | 370/255 |
| 2007/0011448 A1 | 1/2007 | Chhabra et al. | 713/151 |
| 2007/0217611 A1* | 9/2007 | Weis | 380/277 |
| 2008/0002724 A1* | 1/2008 | Grewal et al. | 370/401 |
| 2008/0123652 A1* | 5/2008 | Akyol | 370/392 |
| 2008/0126559 A1* | 5/2008 | Elzur et al. | 709/232 |
| 2008/0130894 A1* | 6/2008 | Qj et al. | 380/277 |
| 2008/0270785 A1* | 10/2008 | Loprieno et al. | 713/150 |

OTHER PUBLICATIONS

"*Ethernet Service OAM: Overview, Applications, Deployment, and Issues,*" The Possibilities Are Infinite, Copyright 2006 Fujitsu Network Communications, Inc., us.fujitsu.com/telecom,1 9 pages, 2006.

"*Media Access Control (MAC) Security*", IEEE P802.1AE/D5.1, Draft Standard for Local and Metropolitan Area Networks, Sponsor: LAN MAN Standards Committee of the IEEE Computer Society, prepared by the Security Task Group of IEEE 802.1, Institute of Electrical and Electronics Engineers, Inc., 150 pages, Jan. 19, 2006.

"*Virtual Bridged Local Area Networks—Amendment 5: Connectivity Fault Management*", IEEE P802.1ag/D8, Draft Standard for Local and Metropolitan Area Networks, Sponsor: LAN MAN Standards Committee of the IEEE Computer Society, prepared by the Interworking Task Group of IEEE 802.1, Institute of Electrical and Electronics Engineers, Inc., 248 pages, Feb. 8, 2007.

Nadeau, Thomas D., et al., "*Detecting MPLS Data Plane Failures in Inter-AS and inter-provider Scenarios*," Network Working Group, Internet Draft, Category: Standards Track, 18 pages, Mar. 2007.

"*Virtual Bridged Local Area Networks—Amendment 5: Connectivity Fault Management*", IEEE P802.1ag/D8.1, Draft Standard for Local and Metropolitan Area Networks, Sponsor: LAN MAN Standards Committee of the IEEE Computer Society, prepared by the Interworking Task Group of IEEE 802.1, Institute of Electrical and Electronics Engineers, Inc., 255 pages, Jun. 18, 2007.

ITU Recommendation Y.1731, "*OAM functions and mechanisms for Ethernet based networks,*" International Telecommunication Union, Telecommunication Standardization Sector, Study Period 2005-2008, Study Group 13, TD 344 (PLEN), 82 pages, Jan. 14-25, 2008.

Katz, D., et al., "*Bidirectional Forwarding Detection*," draft-ietf-bfd-base-08.txt, Network Working Group, Internet Draft, 44 pages, Mar. 2008.

Katz, D., et al., "*Bidirectional Forwarding Detection*," draft-ietf-bfd-base-08.txt, Network Working Group, Internet Draft, 47 pages, Mar. 2008.

"*Carrier Ethernet: Enabling Secure Communications*", The Metro Ethernet Forum 2008, http://www.metroethernetforum.org, 9 pages, Jan. 2008.

\* cited by examiner

FACILITATING PROTECTION OF A MAINTENANCE ENTITY GROUP

TECHNICAL FIELD

This invention relates generally to the field of communication networks and more specifically to facilitating protection of a maintenance entity group.

BACKGROUND

A network may include multiple domains, such as subscriber, provider, and operator domains. Maintenance packets, such as Operations, Administration, and Maintenance (OAM) packets, are used to maintain the operational status of the network. In certain situations, a maintenance point should be prevented from processing and possibly responding to a maintenance packet that is from a non-trusted source, has been altered in transit, or has been copied and replayed. Known techniques for achieving this, however, are not satisfactory in certain situations.

SUMMARY OF THE DISCLOSURE

In accordance with the present invention, disadvantages and problems associated with previous techniques for facilitating protection of a maintenance entity group may be reduced or eliminated.

According to one embodiment, maintenance points of a maintenance entity group are identified. The maintenance points comprise end points and intermediate points. A secure connectivity association set is established for the maintenance points. The following is performed for each frame of a number of frames: determining security data of the secure connectivity association set; placing the security data into a frame; and communicating the frame to a maintenance point. The maintenance point is configured to determine whether a frame is acceptable from the security data of the frame.

Certain embodiments of the invention may provide one or more technical advantages. A technical advantage of one embodiment may be that security data in a maintenance packet allows a maintenance point of a maintenance entity group to check whether the packet belongs to the maintenance entity group. Another technical advantage of one embodiment may be that the security data allows the maintenance point to certify that the packet originated from a trusted source. Another technical advantage of one embodiment may be that the security data may allow encryption of maintenance information. Another technical advantage of one embodiment may be that the security data may include a sequence number field that provides replay protection.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
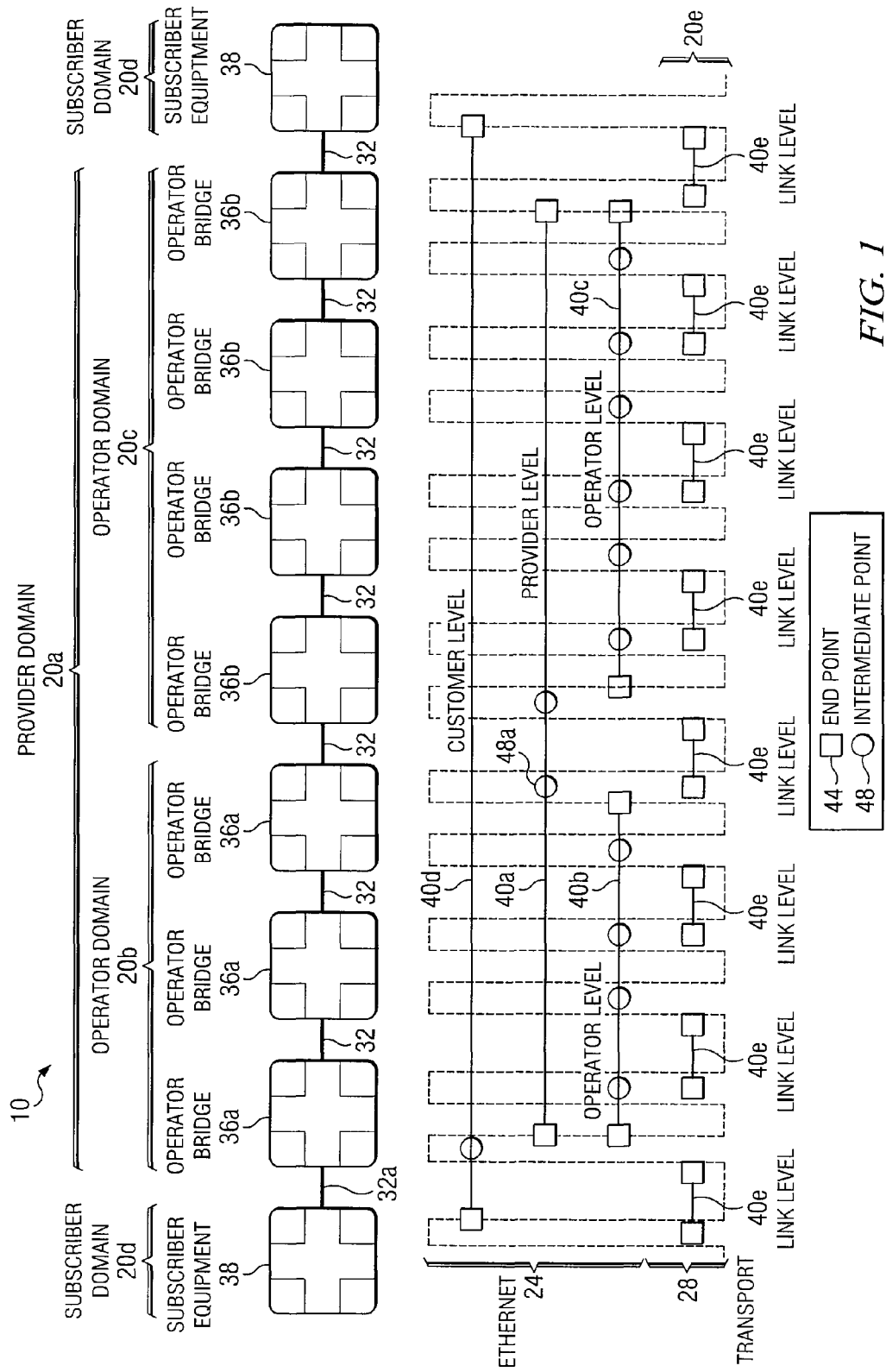
FIG. 1 illustrates an example of a network in which protection of a maintenance entity group (MEG) may be facilitated.
Figure 2:
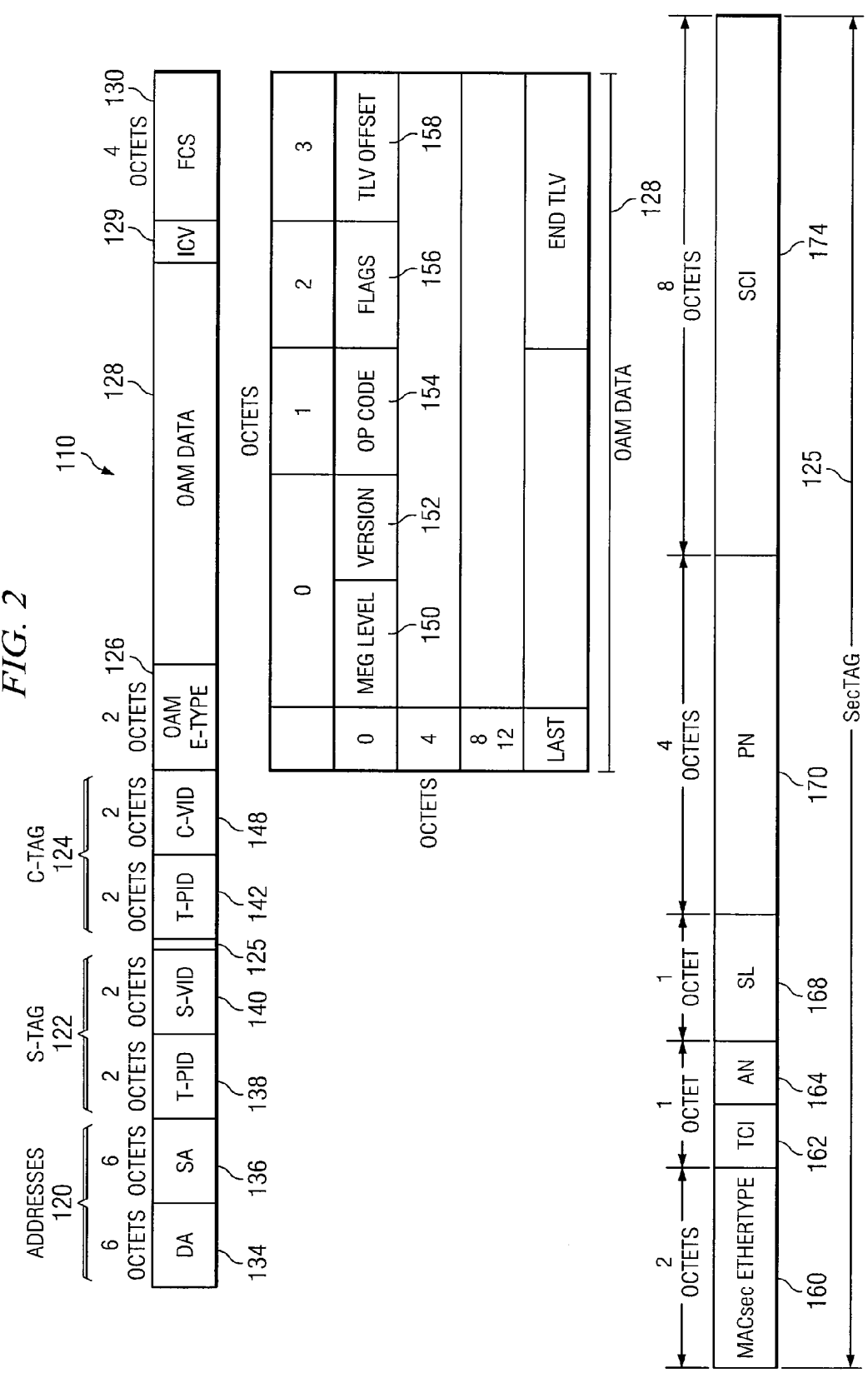
FIG. 2 illustrates an example of a secure maintenance packet.
Figure 3:
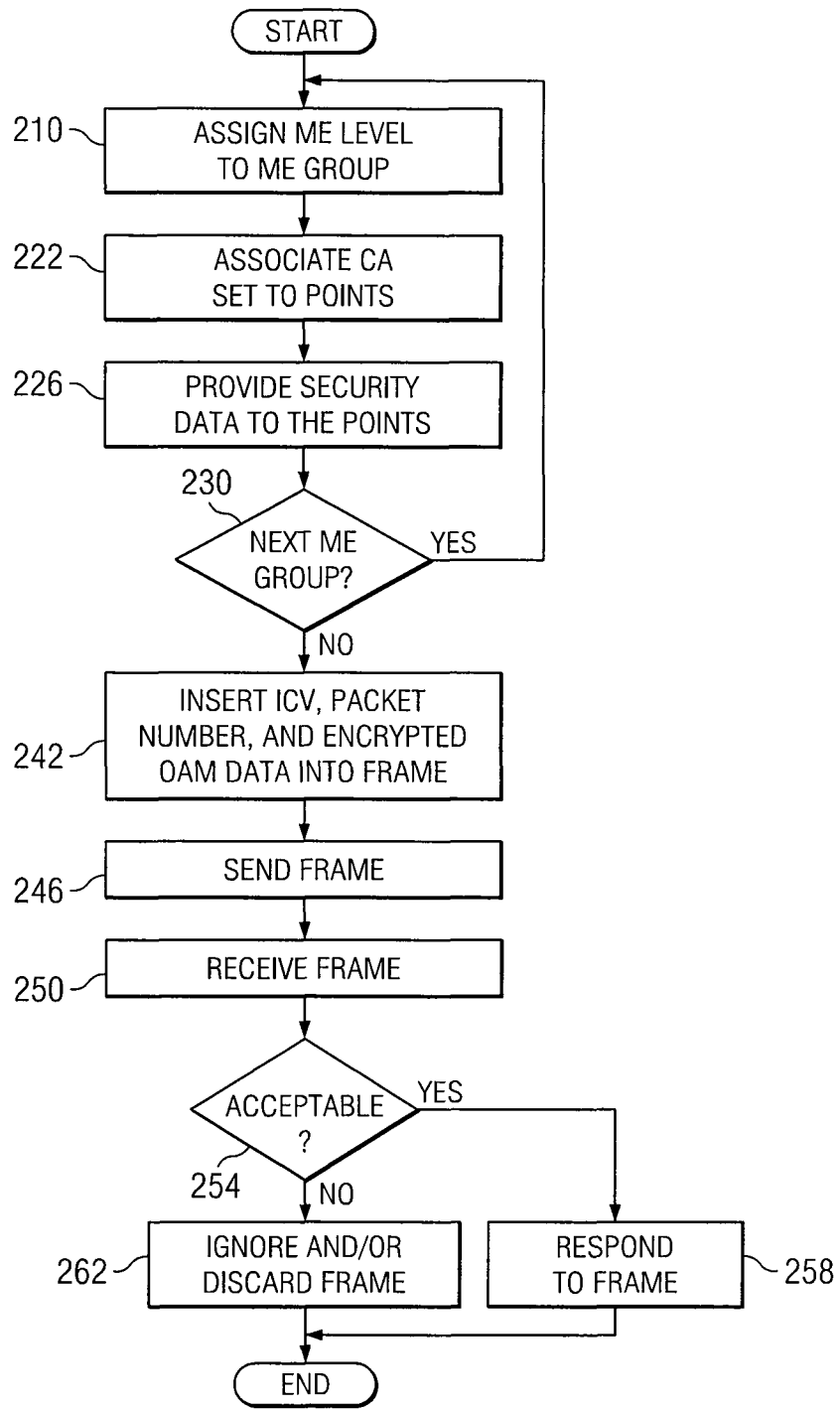
FIG. 3 illustrates an example of a method for facilitating protection of a maintenance entity group.

Embodiments of the present invention and its advantages are best understood by referring to FIGS. 1 through 3 of the drawings, like numerals being used for like and corresponding parts of the various drawings.

FIG. 1 illustrates an example of a network 10 in which protection of a maintenance entity group (MEG) may be facilitated. In the embodiment, network 10 includes domains 20 that support a hierarchical set of maintenance entity groups 40. A maintenance end point (MEP) of a maintenance entity group 40 sends a maintenance packet that includes security data to other maintenance points of the maintenance entity group 40. A maintenance point that receives the packet can use the security data to determine whether to respond to the message. The maintenance point may use the security data to check whether the packet belongs to the maintenance entity group 40 and/or may certify the packet.

In one embodiment, maintenance packets, such as OAM frames, are authenticated to certify that they were initiated by maintenance points within a domain and that the message content has not been altered in transit. In another embodiment, the maintenance packets have encrypted content to hide the content from traversed domains. In another embodiment, the maintenance packets include a sequence number field. The receiving maintenance point can use this field to check whether an entity is copying and replaying past messages.

In the illustrated embodiment, network 10 includes domains 20 such as a provider domain 20a, operator domains 20b-c, a subscriber domain 20d, and link domains 20e. A domain 20 may represent an Operation, Administration, and Maintenance (OAM) domain that manages the operation of elements of the domain 20. Different domains 20 may be managed by different entities, such as different companies.

The operations of provider domain 20a, operator domains 20b-c, subscriber domains 20d, and link domains 20e are performed by network elements of domains 20, which may operate at the Ethernet layer 24. Provider domain 20a represents a domain that provides communication services to subscriber domain 20d that allow network elements to communicate with each other. The network elements of a provider network of provider domain 20a provide the services. Provider domain 20a may utilize network elements of operator domains 20b-c, such as operator bridges 36, to provide the services. Examples of a provider network and operator bridges 36 include all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

A subscriber domain 20 represents the domain of a subscriber. A subscriber is an entity that receives services from provider network 34, typically as a result of subscribing to the services. Subscriber equipment 38 of subscriber domain 20 represents packet network equipment associated with a subscriber. Examples of subscriber equipment 38 include bridges, routers, media converters, network interface devices, telephones, computers, modems, set-top boxes, key phone systems, private branch exchanges, and/or other devices that allow a subscriber to receive services from provider network 34.

The operations of link domain 20*e* are performed by links 32 of a transport layer 28. Links 32 represent a wired or wireless link of any suitable technology operable to transfer packets between network elements. Examples of links 32 include Ethernet, Synchronous Optical Networking/Synchronous Digital Hierarchy (SONET/SDH), 802.11 wireless, 802.16 wireless, and/or other links.

Domains 20 may be hierarchical. The hierarchy may result from layering and/or agreements between domain owners. In the illustrated embodiment, customer domain 30*d* traverses provider domain 20*a*, which utilizes operator domains 20*c* and 20*d*. Operator domains 20*c* and 20*d* are adjacent domains that are independent of each other. In particular embodiments, network management systems (NMSs) may perform maintenance operations for the domains 20. A network management system may be a separate network element or may be part of a network element that performs operations other than maintenance operations.

The network elements of a domain 20 may support a maintenance entity group 40. A maintenance entity group 40 is a set of maintenance entities that support the management of service instances. According to one embodiment, the maintenance points of a maintenance entity group may be in the same administrative region and/or the same point-to-point, point-to-multipoint, or multipoint-to-multipoint Ethernet connection. Maintenance entity groups can be configured for individual service instances or an aggregation of multiple service instances. Maintenance entity groups 40 may be nested to accommodate one or more domains 20. According to another embodiment, the maintenance points of a maintenance entity group may be in different domains. For example, inter-domain links and maintenance intermediate points at the edges of domains may be in different domains.

In the illustrated embodiment, maintenance entity groups 40 includes a provider maintenance group 40*a*, operator maintenance entity groups 40*b* and 40*c*, a subscriber maintenance entity group of 40*d*, and inter-domain link maintenance entity groups 40*e*. Provider maintenance entity group 40*a* is managed by provider domain 20*a*, operator maintenance entity group 40*b* is managed by operator domain 20*b*, and operator maintenance entity group 40*c* is maintained by operator domain 20*c*, and subscriber maintenance entity group 40*d* is managed by subscriber domains 20*d*. Inter-domain maintenance entity group 40*e* may be managed by the interconnected domains.

The maintenance entities of a maintenance entity group 40 are maintenance points comprising one or more end points 44 and one or more intermediate points 48. The maintenance points may represent entities that are provisioned within an network element. An end point 44 is a maintenance functional entity implemented at the ends of a maintenance entity group. An end point 44 may generate and receive packets such as OAM frames. An intermediate point 48 represents a maintenance functional entity between end points 44. An intermediate point 48 responds to packets received from end points and may forward these packets to downstream intermediate points and end points.

A maintenance entity group 40 may be assigned a maintenance entity (ME) level. The maintenance entity level of a group 40 can be encoded in packets, for example, in an maintenance entity level field of an Ethernet OAM Packet Data Unit (PDU), in order to distinguish the packets of the group 40 from packets of other groups 40. For example, maintenance entity level may be used to distinguish packets for groups 40 that are nested. In certain situations, maintenance entity level does not provide satisfactory protection.

In one embodiment, provider maintenance entity group 40*a* has a provider level, operator maintenance entity group 40*b* has one operator level, operator maintenance entity group 40*c* has another operator level, subscriber maintenance entity group 40*d* has a subscriber level, and level maintenance entity group 40*e* has an intra-domain link level.

In one embodiment, the maintenance entities of a maintenance entity group 40 are provisioned with the maintenance entity level of the group 40. A network management system may perform the provisioning. An OAM protocol, for example, 802.1ag/Y.1731, may be used to encode the maintenance entity level in to Protocol Data Units (PDUs) to distinguish the OAM messages from a number of interconnected domains.

In one embodiment, a secure connectivity association set is established for each maintenance entity group 40 to provide protected and secure OAM communication within a group 40. A secure connectivity association set supports a set of unidirectional point-to-multipoint secure channels, and may be implemented, for example, by the Institute of Electrical and Electronics Engineers (IEEE) 802.1ae a Media Access Control Security (MACSec) connectivity association set. A secure channel provides security guarantees for packets transmitted from one member of a connectivity set to other members. In the embodiment, a secure channel is established between each end point 44 and its associated end points 44 and intermediate points 48. A secure channel is also established between each intermediate point 48 and associated end points 44.

In the embodiment, the secure connectivity association sets allow for the application of a security protocol, such as MACSec, that may provide authentication, encryption, and/or replay protection. In one example, the packets include security data, such as a security tag and an Integrity Check Variable (ICV), (for example, as provided by an IEEE 802.1ae MACsec secure MAC header).

The security data may be used to perform any suitable security operation. Examples of security operations include authentication, integrity protection, encryption, replay protection, and/or other suitable security operation.

Authentication checks whether a packet originated at a trusted source (for example, another member of the group 40), and integrity protection checks whether the contents of a packet has not been altered. In certain embodiments, integrity protection and authentication may be implemented using an ICV field, a cipher suite, and keys (which may be provisioned or distributed by a key management protocol).

For example, at the transmit end, the cipher suite calculates an initial ICV based on the contents of the transmit packet and a key. At the receive end, the cipher suite calculates a new ICV from the contents of the received frame and key. If the new ICV does not match the initial ICV in the packet, then the packet may have been altered in transit or the packet might not have originated at a trusted source. In certain embodiments, integrity protection may be required because maintenance entity level filters may be incorrectly provisioned or may be out of service. In certain embodiments, authentication may be required if one domain is testing end or intermediate points at the edge of another domain. In these inter-domain scenarios, the domains share the same maintenance entity level, and maintenance entity level filters cannot be utilized as a security mechanism. In another embodiment, one domain may send OAM packets across one or more transit domains. A security measure, such as encryption, may be applied to hide the contents of these packets from the transit domains.

Encryption encrypts contents of the frame payload. In certain embodiments, the cipher suite and key are used to encrypt the payload at the transmit end. At the receive end, the cipher suite algorithms and key are used to transform the payload back to the original form.

Replay protection checks whether a packet has been copied and replayed in an unauthorized manner. In certain embodiments, a packet number field in the Security Tag is used to check for this.

Security operations may be performed at any suitable level. In certain embodiments, security data can be used to ensure that maintenance points communicate only with other trusted maintenance points and that OAM information has not been altered. When a maintenance point of the group 40 receives a packet, the maintenance point responds only if the security data indicates that the packet is acceptable (for example, certified to be from a trusted source and/or has maintained its integrity).

In certain embodiments, security operations may be performed at the inter-domain level for cases in which domains share the same maintenance entity level. For example, links 32 at the interface between domains 20 (for example, link 32a) or maintenance intermediate points 48 at the edge of a domain 20 (for example, point 48a), may support inter-domain maintenance.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic comprising software, hardware, and/or other logic. As used in this document, "each" refers to each member of a set or each member of a subset of a set.

FIG. 2 illustrates an example of a 110. In the illustrated embodiment, frame 110 is a secure OAM frame that includes fields for a Media Access Control (MAC) address 120, a service tag (S-Tag) 122, a security tag (SecTAG) 125, a customer tag (C-Tag) 124, an OAM Ethernet type (OAM E-Type) 126, OAM data 128, an Integrity Check Variable (ICV) 129, and a frame check sequence (FCS) 130.

MAC address 120 includes a destination address 134 and a source address 136. Service (or provider) tag 122 includes a tag protocol identifier (T-PID) 138 and a service virtual local area network (S-VLAN) identifier (S-VID) 140. A service VLAN may correspond to one Ethernet service instance. A provider may provision one secure connectivity association and one maintenance entity group for each S-VLAN/service instance. Customer tag 124 includes a tag protocol identifier (T-PID) 142 and a customer VLAN identifier (S-VID) 144.

Integrity Check Variable (ICV) 129 includes security data used by a maintenance point to determine whether frame 110 is acceptable (for example, frame 10 comes from a trusted source and has not modified in transit). In the illustrated embodiment, security tag 124 includes fields for an Ethernet type 160, a tag control information (TCI) 162, a secure association number (AN) 164, a short length (SL) 168, a packet number (PN) 170, and a security channel identifier (SCI) 174.

MACsec Ethernet type 160 indicates that the frame includes a security tag and an ICV, and that the frame is capable of supporting secure connectivity associations. TCI 162 indicates usage options, such as whether encryption is enabled or not or whether the security tag includes an SCI field. The field of TCI 162 may include six flag bits that indicate the usage options. Secure association number 164 includes a secure association identifier that indicates a security association, which may be set by a MACsec security function. In certain embodiments, secure connectivity associations may be established for data frames independent of the secure connectivity associations that are established for maintenance entity groups. If encryption is used for both data and OAM frames, then the secure association 164 can be used to distinguish OAM and data frames (such as secure OAM frames and secure data frames). If encryption is not used then OAM Ethernet type 126 can be used to distinguish data and OAM frames.

Secure association number 164 can be used to identify frames to be checked, even if OAM Ethernet type 126 is encrypted. In one embodiment, only OAM frames, only data frames, or both OAM and data frames may be securely encoded. For example, to secure both OAM packets and data packets and to distinguish between the two flows, AN can be set to 0 for secure OAM packets and AN can be set to 1, 2, or 3 for secure data packets.

A maintenance entity group may support one or more service instances. Secure association number 164 can be used to create separate security connectivity associations for the OAM frames for groups of one or more service instances or groups of different customer locations. Different security keys can be used for each secure connectivity association.

Secure association number 164 may be used to encode a redundant encoded MEG level in, for example, networks that support four or fewer domains. The redundant MEG level may serve as an additional security check. Also, the redundant MEG level may be accessed if MEG level 150 is encrypted. ME level, MEG ID, and MEP ID may be encoded into the AN and SCI fields to provide ME level, MEG ID, and MEP ID checks.

Short length 168 indicates the number of octets between the end of security tag 125 and the beginning of ICV 129. Packet number 170 identifies frame 110. Packet number 170 may be used to determine if the same frame has been copied and repeatedly replayed. Secure channel identifier 174 may be used to identify the secure association for multipoint connectivity association. The SCI may include a system identifier (first six octets) and a port identifier (last two octets). Maintenance entity point identifier (MEP ID) and maintenance entity group identifier (MEG ID) values can be encoded to match the Security Tag SCI value. For example, the first six octets can match the MEG ID and the last two octets can match the MEP ID. This may provide an additional security check and simplify provisioning.

OAM data 128 includes fields for a MEG level 150, a version 152, an operational code 154, flags 156, and type, length, value (TLV) parameters 158. Operational code 154 may be used to encode the type of OAM message.

ICV 129 includes data that is calculated by a cipher suite based on the contents of the transmit packet and a security key. Security keys can either be provisioned or distributed by an appropriate protocol. The contents of the frame 110 between the security tag and the ICV may be encrypted. For example, customer VLAN Tag (C-Tag) 124, OAM Ethernet type 126, and OAM Data 128 may be encrypted.

A secure connectivity association set has a key, such as a MACsec key. A MACsec key may have a connectivity association (CA) key and a secure association (SA) key. The SA key may be changed periodically to provide enhanced security. The CA key is typically a master key which may be used by the endpoints in a connectivity association for mutual authentication. The CA key and the SA key may be combined to generate the key that is used by the cipher suite to perform packet authentication and/or encryption.

The keys may be provided in any suitable way. For example, the keys may be provisioned by any suitable provisioning system, for example, a network management system, control plane, or key management protocol. In addition, the keys may be static or periodically changed. Furthermore, the same key may be used for some or all maintenance entity groups 40 of a domain 20, or different keys may be used for each maintenance entity group 40 of a domain 20.

Frame 110 may be any other suitable frame. For example, frame 110 may be a virtual local area network (VLAN), tagged Ethernet OAM frame, such as those sourced by IEEE 802.1ah and IEEE 802.1ay bridges. The bridges may include backbone MAC source and destination address fields, a backbone VLAN tag (B-Tag), and/or a service ID tag (I-SID).

Modifications, additions, or omissions may be made to frame 110 without departing from the scope of the invention. Frame 110 may include more, fewer, or other information. Additionally, the information may be arranged in any suitable order.

FIG. 3 illustrates an example of a method for facilitating protection of a maintenance entity group 40. Steps 210 through 238 may be performed by network management systems and bridges 36 of various domains 20 in order to provide security data to the points of maintenance entity groups 40. The method begins at step 210, a maintenance entity level is assigned to a maintenance entity group 40 at step 214. Maintenance entity group 40 includes end points 44 and intermediate points 48. A secure connectivity association (CA) set is associated with the points of group 40 at step 222. The set may be associated with the points by provisioning secure association 164 and secure channel identifier 174. The parameters may be encoded into the security tag of OAM frames that are generated by maintenance end points and maintenance intermediate points of maintenance entity group 40. Security data corresponding to the CA set is provided to the maintenance points at step 226. Security data may communicate the maintenance entity level of group 40, and may include a security tag and/or an integrity check variable.

There may be a next maintenance entity group 40 at step 230. If there is a next group 40, the method returns to step 214 to select the next group 40. If there is no next group 40, the method proceeds to step 242. The same or different management system may perform the next iteration of steps 210 through 230.

Steps 242 and 246 may be performed by a sending point that sends a frame 110 to be maintained within domain 20. Security data is inserted into frame 110 at step 242. The security data may include ICV 129 (which is calculated from the packet contents, the key, and the cipher suite), the packet number (which is incremented by one for each packet that is transmitted), and the encrypted OAM data between the security tag and ICV 129. The encryption may be performed using the key and cipher suite. Frame 110 is then sent at step 246 to a destination point.

Steps 250 through 232 may be performed by a receiving point that receives frame 110. The receiving point receives frame 110 at step 250. The receiving point determines whether the frame is acceptable at step 254, that is, frame 110 was generated by a trusted source and was not altered or replayed in transit. The determination may be made using ICV 129, packet number 170, secure association 164, and security channel identifier 17. For example, the receiving point computes an ICV and compares the computed ICV to the received ICV; verifies that the PN is correct; and verifies that the AN and SCI are correct. If frame 110 is encrypted, then the receiving point may apply the key and cipher suite decryption algorithm to recover the original OAM data.

If frame 110 is acceptable, the receiving point responds to frame 110 at step 258, and the method terminates. If frame 110 is not acceptable, the method proceeds to step 262, where the receiving point ignores (which may involve not responding to or not forwarding frame 110) and/or discards frame 110. The receiving point may log a security event and/or maintain a count of security events. The network management system may retrieve the security event logs and generate an alarm message at a client interface. For example, an alarm may be generated if a maintenance packet security failure count exceeds a threshold. The network management system may then display the alarm at the interface. The method then terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that security data in a packet allows a maintenance point of a maintenance entity group to check whether the packet belongs to the maintenance entity group. Another technical advantage of one embodiment may be that the security data allows the maintenance point to certify the packet.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   identifying a plurality of maintenance points of a maintenance entity group, the plurality of maintenance points comprising a plurality of end points and one or more intermediate points;
   establishing a Media Access Control Security (MACSec) connectivity association set for the plurality of maintenance points of the maintenance entity group, wherein establishing the MACSec connectivity association set comprises establishing a secure channel between each end point and associated end points and intermediate points and establishing a secure channel between each intermediate point and associated end points; and performing the following for each frame of a plurality of frames:

determining security data of the MACSec connectivity association set, the security data facilitating determination of whether the each frame is acceptable;

placing the security data into the each frame;

encoding one or more parameters in a security tag of the each frame, the one or more parameters selected from a group consisting of: a maintenance entity level encoded in a secure association number field of the security tag, a maintenance entity group identifier encoded in a secure channel identifier field of the security tag, and a maintenance end point identifier encoded in the secure channel identifier field of the security tag; and communicating the frame to a maintenance point, the maintenance point configured to determine whether the each frame is acceptable from the security data.

2. The method of claim 1:
the determining the security data of the MACSec connectivity association set further comprising:
calculating an integrity check variable; and
the placing the security data into the each frame further comprising:
placing the integrity check variable into the frame.

3. The method of claim 1, the determining the security data of the MACSec connectivity association set further comprising:
calculating an integrity check variable according to content of the frame, a key, and a cipher suite algorithm.

4. The method of claim 1, the each maintenance point configured to determine whether the frame is acceptable by:
calculating an integrity check variable according to content of the frame, a key, and a cipher suite algorithm; and
comparing the calculated integrity check variable with a received integrity check variable received in the frame.

5. The method of claim 1:
the determining the security data of the MACSec connectivity association set further comprising:
determining a packet number for the frame; and
the placing the security data into the each frame further comprising:
placing the packet number into the frame.

6. The method of claim 1, the each maintenance point configured to determine whether the frame is acceptable by:
checking a packet number of the frame to determine if the frame is in the correct sequence.

7. The method of claim 1, further comprising:
encrypting data of the frame according to a key and a cipher suite algorithm.

8. The method of claim 1, the each maintenance point further configured to:
decrypt data of the frame according to a key and a cipher suite algorithm.

9. The method of claim 1, the each maintenance point configured to respond to the frame, the frame determined to be unacceptable, by performing one or more responses selected from a group consisting of a plurality of responses:
ignore the packet;
discard the packet;
maintain a count of one or more packet security failures;
maintain a log of one or more packet security failures; and
generate an alarm.

10. The method of claim 1, further comprising:
using a secure association number to distinguish between the frame and a secure data frame, the frame comprising a secure Operations, Administration, and Maintenance frame.

11. One or more non-transitory computer-readable tangible media encoding software configured to, when executed:
identify a plurality of maintenance points of a maintenance entity group, the plurality of maintenance points comprising a plurality of end points and one or more intermediate points;
establish a Media Access Control Security (MACSec) connectivity association set for the plurality of maintenance points of the maintenance entity group, wherein establishing the MACSec connectivity association set comprises establishing a secure channel between each end point and associated end points and intermediate points and establishing a secure channel between each intermediate point and associated end points; and
perform the following for each frame of a plurality of frames:
determine security data of the MACSec connectivity association set, the security data facilitating determination of whether the each frame is acceptable;
place the security data into the each frame;
encode one or more parameters in a security tag of the each frame, the one or more parameters selected from a group consisting of: a maintenance entity level encoded in a secure association number field of the security tag, a maintenance entity group identifier encoded in a secure channel identifier field of the security tag, and a maintenance end point identifier encoded in the secure channel identifier field of the security tag; and
communicate the frame to a maintenance point, the maintenance point configured to determine whether the each frame is acceptable from the security data.

12. The non-transitory computer-readable tangible media of claim 11, the software further configured to:
determine the security data of the MACSec connectivity association set by:
calculating an integrity check variable; and
place the security data into the each frame by:
placing the integrity check variable into the frame.

13. The non-transitory computer-readable tangible media of claim 11, the software further configured to determine the security data of the MACSec connectivity association set by:
calculating an integrity check variable according to content of the frame, a key, and a cipher suite algorithm.

14. The non-transitory computer-readable tangible media of claim 11, the each maintenance point configured to determine whether the frame is acceptable by:
calculating an integrity check variable according to content of the frame, a key, and a cipher suite algorithm; and
comparing the calculated integrity check variable with a received integrity check variable received in the frame.

15. The non-transitory computer-readable tangible media of claim 11, the software further configured to:
determine the security data of the MACSec connectivity association set by:
determining a packet number for the frame; and
place the security data into the each frame by:
placing the packet number into the frame.

16. The non-transitory computer-readable tangible media of claim 11, the each maintenance point configured to determine whether the frame is acceptable by:

checking a packet number of the frame to determine if the frame is in the correct sequence.

17. The non-transitory computer-readable tangible media of claim 11, the software further configured to:
   encrypt data of the frame according to a key and a cipher suite algorithm.

18. The non-transitory computer-readable tangible media of claim 11, the each maintenance point further configured to:
   decrypt data of the frame according to a key and a cipher suite algorithm.

19. The non-transitory computer-readable tangible media of claim 11, the each maintenance point configured to respond to the frame, the frame determined to be unacceptable, by performing one or more responses selected from a group consisting of a plurality of responses:
   ignore the packet;
   discard the packet;
   maintain a count of one or more packet security failures;
   maintain a log of one or more packet security failures; and
   generate an alarm.

20. The non-transitory computer-readable tangible media of claim 11, the software further configured to:
   use a secure association number to distinguish between the frame and a secure data frame, the frame comprising a secure Operations, Administration, and Maintenance frame.

* * * * *